United States Patent [19]

Chiba

[11] Patent Number: 4,760,109

[45] Date of Patent: Jul. 26, 1988

[54] POLYAMIDE RESIN COMPOSITIONS

[75] Inventor: Kazumasa Chiba, Nagoya, Japan

[73] Assignee: Stamicarbon B. V., Geleen, Netherlands

[21] Appl. No.: 890,779

[22] PCT Filed: Nov. 20, 1985

[86] PCT No.: PCT/NL85/00046

§ 371 Date: Jul. 15, 1986

§ 102(e) Date: Jul. 15, 1986

[87] PCT Pub. No.: WO86/03212

PCT Pub. Date: Jun. 5, 1986

[30] Foreign Application Priority Data

Nov. 21, 1984 [JP] Japan ............................. 59-244388

[51] Int. Cl.$^4$ ....................... C08L 77/00; C08L 81/04
[52] U.S. Cl. .................................... 524/452; 524/606; 524/609; 525/420; 525/537
[58] Field of Search .............. 525/420, 537; 524/452, 524/606, 609

[56] References Cited

U.S. PATENT DOCUMENTS 4,292,416  9/1981  Shue .
4,446,304  1/1984  Gaymans ........................... 528/336
4,528,335  7/1985  Selby .

FOREIGN PATENT DOCUMENTS 0069255  6/1978  Japan ................................. 525/420

OTHER PUBLICATIONS

"Van Th-Nylon Tot Stanyl"—THThema 13—Sep. 1984, p. 10.
Chemical and Engineering News—May 21, 1984, pp. 33–34 (Technology).

Primary Examiner—John C. Bleutge
Assistant Examiner—A. Carrillo
Attorney, Agent, or Firm—Cushman, Darby & Cushman

[57] ABSTRACT

The subject invention relates to novel resin compositions comprising polytetramethylene adipamide and polyarylene sulfide, that are superior in mechanical strength, rigidity chemical resistance, heat resistance and moldability.

9 Claims, No Drawings

POLYAMIDE RESIN COMPOSITIONS

BACKGROUND OF THE INVENTION

1. Field of the Invention

The subject invention relates to novel resin compositions comprising polytetramethylene adipamide and polyarylene sulfide and being superior in mechanical strength, rigidity, chemical resistance, heat resistance and moldability.

2. Description of Prior Art

The various engineering plastics developed lately have found special applications for manufacturing various kinds of automotive, general machinery, electric and electronic parts based on the optimal use of their specific features. Besides technological progress has been made by combining more than two kinds of polymers so that their respective defects are eliminated thanks to their complementary effects. In many cases, however, no compositions having satisfactory characteristics and practical values are obtainable by combining different kinds of polymers because their defects remain uneliminated frequently.

In the case of the combinations of polyamides and polyphenylene sulfide, (PPS), U.S. Pat. No. 4,292,416 describes the blending of small amounts of PPS as nucleating agent in polyamides, to improve the crystallinity and related properties. Less than 3% by weight of PPS is added and suitable polyamides are polyamides derived from terephthalic acid and branched aliphatic diamines containing ten carbon atoms. In the Japanese Patent Application No. 069255/1978 blends of small amounts of nylon-6 and 6.6 with PPS are described in which the impact resistance of the latter is improved.

However until yet no polyamide-PPS blends with polyamide as main component that show outstanding properties for a wide range of applications have been reported.

One reason for this may be the fact that polyamide such as nylon 6 and 6.6 are insufficiently compatible with PPS and no homogeneous mixtures can be obtained.

The object of the invention is therefore to find a combination of polyamide and polyarylene sulfide that can be blended into homogeneous mixtures, in which the superior physical properties of both the components are preserved.

SUMMARY OF THE INVENTION

It has been found by the inventor that polytetramethylene adipamide (nylon 4.6), of which the chemical structure is closely related to that of nylon 6.6, is surprisingly highly miscible with polyarylene sulfide, and that the blends obtained from this polyamide and PPS show the superior physical properties of both components.

The subject invention presents a polyamide resin composition comprising 95 to 50 percent by weight of a polyamide mainly consisting of tetramethylene adipamide and 50 to 5 percent by weight of polyarylene sulfide.

DETAILED DESCRIPTION OF THE INVENTION

The polyamides according to the subject invention are copolymers and mixtures of polyamides containing polytetramethyleneadipamide and tetramethylene adipamide as main components. In principle there exist no limitations concerning the copolymer and mixture components, so that all known amide-forming compounds can be chosen. Representative among the former are 6-aminocaproic, 11-aminoundecanic, 12-aminododecanic, paraminomethylbenzoic and other amino acids; ε-caprolactam, ω-laurolactam and other lactams; hexamethylenediamine, undecamethylenediamine, dodecamethylenediamine, 2.2.4-/2,2,4-trimethylhexamethylenediamine, 5-methylnonamethylenediamine, methaxylirenediamine, paraxylirerediamine, 1,3- and 1,4-bis(aminomethyl)cyclohexanes, 1-amino-3-aminomethyl-3,5,5,-trimethylcyclohexane, bis(4-aminocyclohexyl)methane, bis(3-methyl-4-aminocyclohexyl)methane, 2,2-bis(4-aminocyclohexyl)propane, bis-(aminopropyl)piperazine, aminoethylpiperazine and other diamines and adipic acids; and adipic, suberic, azelaic, dodecane-2, terephthalic, isophthalic, 2-chlorotere-phthalic, 2-methylterephthlatic, 5-methylisophthalic, 5-sodiumsulfoisophthalic, hexahydroterephthalic, hexahydroisophthalic, diglycolic and other dicarboxylic acids. The latter include the polyamides being composed thereof.

Polyamides containing tetramethylene adipamide as main component, for instance more than 80 mole percent, can be produced by any known process. However preference should be given to the processes disclosed in U.S. Pat. Nos. 4,460,762, 4,408,036 and 4,463,166 or EP-A Nos. 0039524, 0038094 and 0077106.

High molecular weight polyamides should be produced through solidphase after condensation in a water-vapor containing atmosphere of prepolymers having small contents of cyclic endgroups, that are produced under specific conditions or in 2-pyrrolidone, N-methylpyrrolidone or another polar organic solvent. Their degree of polymerization can vary in principle over a wide range. The polymers having a relative viscosity between 2.0 and 6.0 g/dl, as measured in a solution of 1 gram in 100 ml 98% by weight sulphuric acid, are preferred.

The polyarylene sulfides according to the subject invention contain a material represented by the general formula —(R1—S)— as main component wherein R1 denotes an aromatic group having at least six carbon atoms.

Representative there among are p-phenylene, m-phenylene, 2,6-naphthalene, 4,4'-biphenylene, p,p'-bibenzyl and their substituents. Preference is given to materials that contain the nonsubstituted p-phenylene nucleus being represented by the general formula

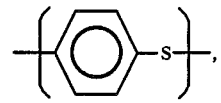

because of their high moldability and their facility of handling. "Main component" herein means that the material contains more than 70 mol percent of the component. Less than 70 mol percents thereof decrease the polymers to be obtained in crystallinity, lower transition temperature or deteriorate their moldings in physical properties. They are permitted to contain up to 30 mol percent aromatic groups having three or more bonding places, e.g. 1,2,4,-phenylene nucleus, aliphatic groups and hetero-atom containing groups.

The processes for producing the polyarylene sulfides according to the subject invention include the condensation between dihalogenated aromatic compounds and dithiol aromatic compounds or monohalogenated aromatic thiol, the desalting polycondensation between dihalogenated aromatic compounds, alkali or hydrogen sulfide or alkali compounds, or similar, but are not limited thereto.

The resin compositions according to the subject invention are composed of 95 to 50, preferably 90 to 55, percents by weight of polytetramethylene adipamide and 50 to 5, preferably 45 to 10, percents by weight of polyaryl sulfide. If the latter is present at less than 5 percents by weight or more than 50 percent by weight, the polyamide compositions are not satisfactorily improved in chemical and heat resistance or considerably fall in impact resistance respectively.

Other materials e.g. pigments, dyes, reinforcers, fillers, heat stabilizers, anti-oxidants, weather resistants, lubricants, nucleating agents, mold release agents, plasticizers, flame retardants, antistatics and other polymers may be added to the resin compositions according to the subject invention unless their moldabilities and physical properties are affected. Particularly the addition of reinforcers and fillers is important. The fibrous and powdery reinforcers available therefor include more specifically glass fibers, asbestos fibers, carbon fibers, graphite fibers, wollastonite, talc, calcium carbonate, mica, clay, potassium titanate whisker and glass beads.

The processes for producing resin compositions according to the subject invention are not limited. One of the most common ones is the melting and mixing of both components supplied to a one- or multishaft extruder eventually after premixing in solid form. The resin compositions according to the invention can be used for the production of moldings being superior in physical properties by injection molding, extrusion, blow-molding, compressive and the other molding methods being used for ordinary thermoplastic resins. They are useful for manufacturing various automotive parts, mechanical parts, electric and electronic parts, general miscellaneous goods and so forth.

EMBODIMENTS

The subject invention will be described in more detail in connection with the examples hereinafter. The following methods were used to evaluate the characteristics of the polymers and their moldings in the examples and comparative examples.

(1) Relative viscosity of polyamides: JIS K6810
(2) Tensile characteristic: ASTM D638
(3) Bending characteristic: ASTM D790
(4) Izod impact strength: ASTM D256
(5) Thermal deformation temperature: ASTM D648
(6) Long-term heat resistance: The tensile test pieces heat-treated at a temperature of 120° C. in air have been tested for the progress of tensile fracture elongation and brittle fracture.
(7) Water absorbability: ASTM D570
(8) Chemical resistance: 10 day's absorption rate was obtained with 3 mm-thick test pieces being kept immersed in methanol at room temperature.

EXAMPLE 1

A mixture prepared by mixing 85 percents by weight of nylon-46 pellets having a relative viscosity of 3.90 and 15 percents by weight of poly-p-phenylene sulfide powder ("Ryton" p-4 made by Phillips Petroleum, the U.S.) was melted, kneaded and pelletized at a temperature of 305° C. using a 30 mm-aperture molder. These pellets were vacuum-dried and used for the molding of various kinds of test pieces for measuring the different physical properties by using an injection molder with its cylinder and mold set to the temperatures of 300° C. and 80° C. respectively. Table 1 shows the data obtained for the various physical properties, indicating that the material possesses outstanding properties. Particularly the long-term heat and chemical resistances have improved, being superior beyond the common knowledge of polyamides, be blending the polyamide with the comparatively-small amounts of poly-p-phenylene sulfide.

COMPARATIVE EXAMPLE 1

The nylon-4,6 that is being used in Example 1 was tested.
Long-term heat resistance (the time of tensile fracture elongation until brittle fracture): 45 days
Water absorption rate: 3.5 percents by weight
Methanol absorption rate: 6.0 percents by weight

COMPARATIVE EXAMPLE 2

Poly-p-phenylene sulfide that is being used in Example 1 showed a very low impact resistance.
Izod impact strength: 1.5 kg.cm/cm-notch.

COMPARATIVE EXAMPLE 3

Example 1 was repeated. However instead of nylon 4,6 nylon 6 was used. The production of test pieces by extrusion showed a very irregular extrusion behavior because the nylon and poly-p-phenylene sulfide are insufficiently compatible. The test pieces obtained by molding showed inferior appearance as well as abnormally-small strength and rigidity values.
1. Tensile yield stress: 720 kg/cm$^2$
2. Bending modulus: 24,300 kg/cm$^2$

EXPERIMENTS 2 TO 7

Table 1 shows the physical properties of test pieces obtained through the same operation as described in connection with Example 1 but with different samples and blending ratios of nylon-4,6 and poly-p-phenylene sulfide.

In all cases polyamide resin compositions being superior in strength, rigidity, impact resistance, heat resistance and chemical resistance were obtained.

EXAMPLE 8

Test pieces were obtained through the same extruder kneading and injection molding as being mentioned in Example 1 of a mixture prepared by adding 45 parts by weight of a chopped strand glass fiber (Nippon Denky Glass ECS03) to 100 parts by weight of a mixture of 80 percent by weight of nylon 4,6 pellets having a relative viscosity of 3.80 and 20 percent by weight of poly-p-phenylene sulfide. The following physical properties were measured.
Tensile strength: 1,900 kg/cm$^2$
Bending strength: 2,600 kg/cm$^2$
Bending modulus: 96,500 kg/cm$^2$
Izod impact strength: 9 kg.cm/cm-notch
Thermal deformation temperature: 285° C.
Water absorption ratio: 1.3% by weight
Methanol absorption ratio: 2.3% by weight.

TABLE 1

| Embodiment | 1 | 2 | 3 | 4 | 5 | 6 | 7 |
|---|---|---|---|---|---|---|---|
| Polyamide[a] | N-46 | N-46 | N-46 | N-46 | N-46/6: 95/5 | N-46/66: 90/10 | N-46//N-66: 90/10 |
| (Relative viscosity) | (3.90) | (3.80) | (3.70) | (3.80) | (5.50) | (3.20) | (3.50) |
| (Amount) (wt. %) | (85) | (80) | (60) | (80) | (75) | (85) | (70) |
| Polyarylene sulfide | "Ryton" P-4 | → | → | "Ryton" V-1 | → | "Ryton" P-4 | → |
| (Amount) (wt. %) | (15) | (20) | (40) | (20) | (25) | (15) | (30) |
| Tensile strength at yield (kg/cm$^2$) | 1,050 | 1,080 | 1,000 | 1,050 | 1,100 | 960 | 990 |
| Elongation at break (%) | 20 | 18 | 10 | 25 | 33 | 30 | 28 |
| Flexural strength (kg/cm$^2$) | 1,140 | 1,150 | 1,080 | 1,140 | 1,020 | 1,040 | 1,050 |
| Flexural modulus (kg/cm$^2$) | 31,000 | 31,400 | 31,000 | 31,100 | 29,800 | 29,400 | 31,500 |
| Izod impact strength (kg · cm/cm-notch) | 6 | 6 | 4 | 7 | 7 | 6 | 6 |
| Heat distortion temp. (°C.) | 170 | 170 | 150 | 172 | 165 | 145 | 170 |
| Long-term heat resistance (day) | 100 | 110 | 150 | 105 | 100 | 100 | 110 |
| Water absorption (wt. %) | 1.7 | 1.5 | 1.1 | 1.6 | 1.5 | 1.9 | 1.4 |
| Methanol absorption (wt. %) | 3.3 | 3.0 | 2.6 | 3.2 | 3.3 | 3.5 | 2.9 |

[a]N-46: Polytetramethylene adipamide
N-46/6: Poly(tetramethylene adipamide/caproamide) copolymer (95/5 wt. %)
N-46/66: Poly(tetramethylene adipamide/hexamethylene adipamide) copolymer (90/10 wt. %)
N-46//N-66: Mixture of polytetramethylene adipamide and polyhexamethylene adipamide (90//10 wt. %)

From these experiments and comparative experiments it is clear that polyamide resin compositions of polytetramethyleneadipamide and polyarylene sulfide according to the subject invention possess outstanding physical properties which reflect the combination of the superior properties of the two components, without appreciable detoriation of any important property of one of the single components.

Since both components are fundamentally crystalline polymers the resin compositions according to the present invention retain crystallinity and possess excellent molding properties.

I claim:

1. Polyamide resin compositions comprising 95 to 50 percent by weight of polyamides having at least 80 mole percent tetramethylene adipamide as main component and 50 to 5 percent by weight of polyarylene sulfide.

2. Polyamide resin composition consisting essentially of 90 to 55 percent by weight of polytetramethylene adipamide and 45 to 10 percent by weight of polyarylene sulfide.

3. Polyamide resin composition according to claim 1, in which the polyarylene sulfide is chosen from the group represented by the general formula —($R_1$—S)— in which $R_1$ is p-phenylene, m-phenylene, 2,6-naphthalene, 4,4'-biphenylene, p,p'-bibenzyl or their substituents.

4. Polyamide resin composition according to claim 3 in which $R_1$ is p-phenylene.

5. Polyamide resin composition according to claim 2, in which the polyarylene sulfide is selected from the group represented by the general formula —($R_1$—S)— in which $R_1$ is p-phenylene, m-phenylene, 2,6-naphthalene, 4,4'-biphenylene, p,p'-bibenzyl or their substituents.

6. Polyamide resin composition according to claim 1 further comprising a reinforcing material.

7. Polyamide resin composition according to claim 6, in which the reinforcing material is fibrous.

8. Polyamide resin composition according to claim 7, in which the fibrous reinforcing material is selected from the group consisting of glass fibers, asbestos fibers, carbon fibers and graphite fibers.

9. Moldings consisting essentially of polyamide resin compositions according to claim 1.

* * * * *